T. C. THORESON.
VEHICLE COUPLING.
APPLICATION FILED MAR. 4, 1920.
1,354,589.
Patented Oct. 5, 1920.
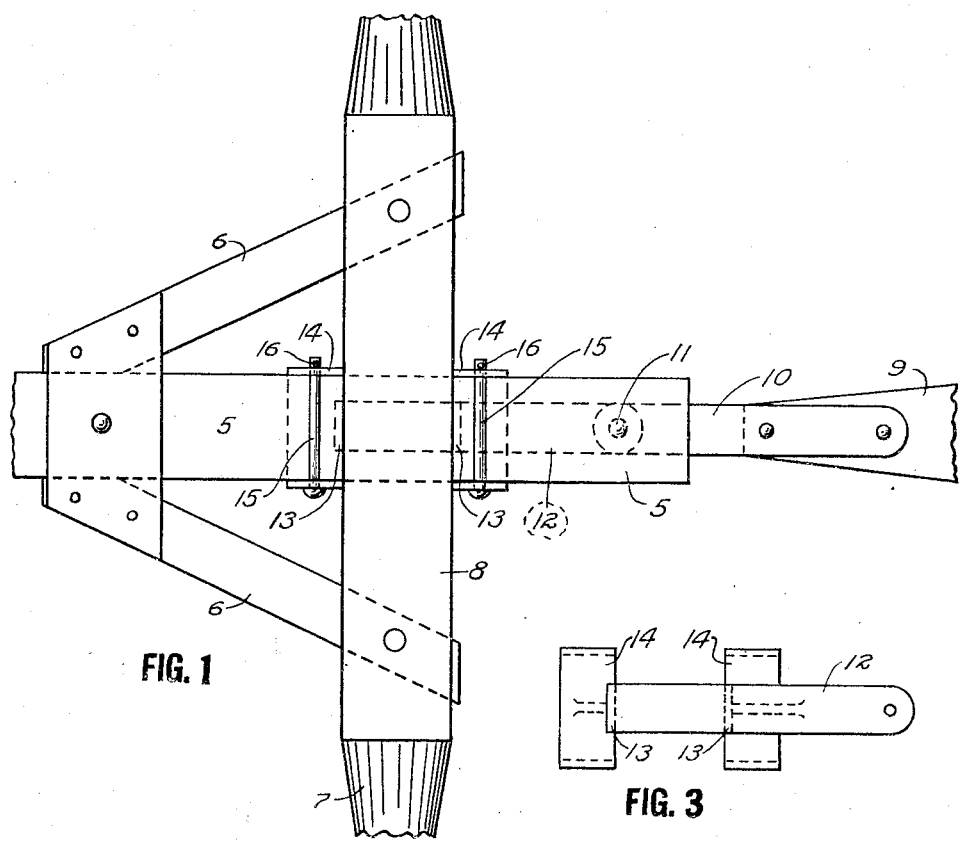
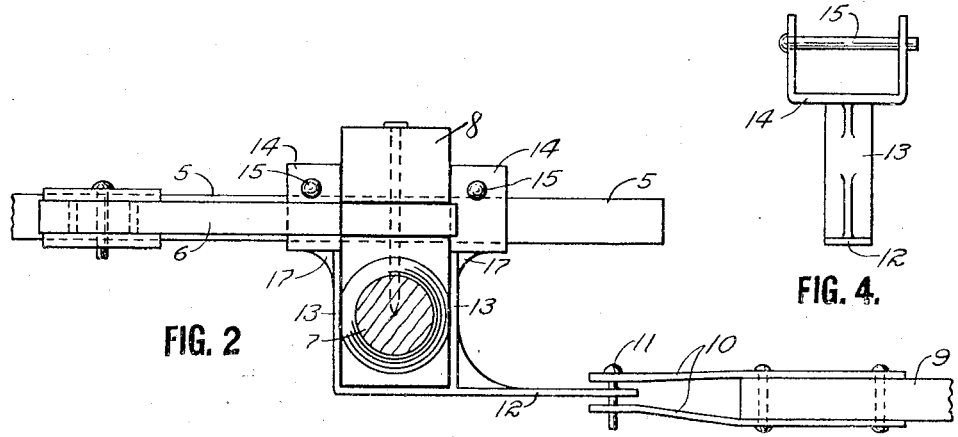
INVENTOR:
T. C. Thoreson
BY his ATTORNEY:
A. M. Carlsen

UNITED STATES PATENT OFFICE.

THORNIE C. THORESON, OF DAWSON, MINNESOTA.

VEHICLE-COUPLING.

1,354,589.  Specification of Letters Patent.  Patented Oct. 5, 1920.

Application filed March 4, 1920. Serial No. 363,267.

*To all whom it may concern:*

Be it known that I, THORNIE C. THORESON, a citizen of the United States, residing at Dawson, in the county of Lac Qui Parle and State of Minnesota, have invented a new and useful Vehicle-Coupling, of which the following is a specification.

My invention relates to vehicle couplings, and the object is to provide a convenient, durable and efficient means for coupling together several wagons or other vehicles or for hitching one of them to a tractor.

In the accompanying drawing:—

Figure 1 is a plan view and Fig. 2 is a side view of the rear portion of the running gear of a wagon or similar vehicle equipped with my new coupling device and a portion of a pole of a second vehicle coupled thereto. Fig. 3 is a bottom view and Fig. 4 is a rear end view of the main member of the coupling separated from the vehicle.

Referring to the drawing by reference numerals, 5 designates the reach, 6 the hounds, 7 the rear axle and 8 the bolster of a wagon. 9 is the front end of the pole of a wagon to be drawn by the first mentioned wagon parts. Said pole 9 is provided with a forked or bifurcated coupling member 10, having a bolt or pin 11, adapted to be dropped into a hole in the draw bar portion 12 of the main coupling member.

Said main member is composed of the horizontal draw bar 12 and two vertical flat arms 13, adapted to fit against the front and rear side of the axle 7 and are each formed at its top with a clip 14. Said clips straddle the reach 5, one in front and the other in rear of the bolster 8, and are each provided with perforations and a horizontal pin 15 placed therein and bearing upon the upper side of the reach. Said pins 15 are held in place by cotter pins 16 or other suitable means which makes the device easily attachable to any ordinary vehicle.

The main coupling member may preferably be cast of malleable iron or steel, though it may also be forged or otherwise constructed. The coupling member 10 is made limber and resilient enough so it may be spread or closed some to make it fit draw bars of different thickness, not only of the type 12, but several other types and sizes carried by different tractors which may not have been equipped with my improved main coupling member.

Said main member having the bracing ribs 17 and being otherwise constructed and applied as described diffuses the draft upon the axle, the bolster and the reach and thereby obviates the twisting and other injurious strain on said parts when one or more vehicles are drawn as a trailer or train behind a front one.

What I claim is:

1. As an improved article of manufacture, a vehicle coupling comprising two members and means for coupling them together, one of the members adapted to be secured on the front end of the tongue or pole of a vehicle, the other member having a U-shaped body fitting over the rear axle and partly over the bolster of a wagon; the arms of said U having at their upper ends U-shaped clips straddling the reach of the wagon and projecting above it, and means resting upon the reach and engaging said projections to support the coupling member.

2. The structure specified in claim 1, said supporting means consisting of horizontal pins passed through the arms of the clips and resting across the reach, and means holding said pins in place.

3. The structure specified in claim 1, said front coupling member having its main body and draw bar portion formed of flat comparatively thin metal and reinforced at its angular points by the bracing ribs 17.

In testimony whereof I affix my signature.

THORNIE C. THORESON.